US012611065B2

(12) United States Patent
Kolar

(10) Patent No.: US 12,611,065 B2
(45) Date of Patent: Apr. 28, 2026

(54) POWERED BLENDING CONTAINER

(71) Applicant: Vita-Mix Management Corporation,
Olmsted Township, OH (US)

(72) Inventor: David Kolar, Stow, OH (US)

(73) Assignee: Vita-Mix Management Corporation,
Olmsted Township, OH (US)

( * ) Notice: Subject to any disclaimer, the term of this
patent is extended or adjusted under 35
U.S.C. 154(b) by 921 days.

(21) Appl. No.: 17/717,380

(22) Filed: Apr. 11, 2022

(65) Prior Publication Data

US 2022/0225838 A1 Jul. 21, 2022

Related U.S. Application Data

(63) Continuation of application No. 15/497,261, filed on
Apr. 26, 2017, now Pat. No. 11,297,980, which is a
continuation of application No. 14/213,557, filed on
Mar. 14, 2014, now Pat. No. 10,638,886.

(60) Provisional application No. 61/787,594, filed on Mar.
15, 2013.

(51) Int. Cl.
*A47J 43/07* (2006.01)
*A47J 43/046* (2006.01)
*B01F 35/212* (2022.01)
*B01F 35/213* (2022.01)
*B01F 35/22* (2022.01)
*B01F 35/60* (2022.01)
*B01F 101/00* (2022.01)
*B01F 101/06* (2022.01)

(52) U.S. Cl.
CPC ......... *A47J 43/0777* (2013.01); *A47J 43/046*
(2013.01); *A47J 43/0727* (2013.01); *B01F*
*35/212* (2022.01); *B01F 35/213* (2022.01);

*B01F 35/2205* (2022.01); *B01F 35/6052*
(2022.01); *B01F 2101/06* (2022.01); *B01F*
*2101/1805* (2022.01)

(58) Field of Classification Search
CPC ................ A47J 43/0766; A47J 43/0772; A47J
43/0777; A47J 43/046
See application file for complete search history.

(56) References Cited

U.S. PATENT DOCUMENTS

| | | | |
|---|---|---|---|
| 112,477 | A | 3/1871 | Merrill |
| 181,013 | A | 8/1876 | Sawyer |
| 298,503 | A | 5/1884 | Rex |

(Continued)

FOREIGN PATENT DOCUMENTS

| | | |
|---|---|---|
| CN | 1860663 | 11/2006 |
| CN | 1860663 A | 11/2006 |

(Continued)

OTHER PUBLICATIONS

Office Action mailed Jul. 26, 2022; Chinese Patent Application No.
202010517215.6 filed Jun. 9, 2020.

(Continued)

*Primary Examiner* — Marc C Howell
(74) *Attorney, Agent, or Firm* — Dinsmore & Shohl LLP

(57) ABSTRACT

A blending device is shown and described. The blending
device may include a blending container and a power source
operatively connected to the blending container. The power
source may be configured to supply power to the blending
container. The blending container may also include a feature
that is powered by the power source.

28 Claims, 6 Drawing Sheets

10

(56) References Cited

U.S. PATENT DOCUMENTS

| | | | |
|---|---|---|---|
| 400,566 | A | 4/1889 | Harry |
| 460,265 | A | 9/1891 | Mulford |
| 698,755 | A | 4/1902 | Stiehle |
| 742,955 | A | 11/1903 | Augur |
| 747,249 | A | 12/1903 | Smith |
| 796,692 | A | 8/1905 | Scantlin |
| 937,772 | A | 10/1909 | Cullen |
| 1,139,534 | A | 5/1915 | Klenk |
| 1,380,066 | A | 5/1921 | Johnson |
| 2,012,113 | A | 8/1935 | Thompson |
| 2,086,858 | A | 7/1937 | Dunkelberger |
| 2,246,054 | A | 6/1941 | Marty |
| 2,282,866 | A | 5/1942 | Hagen |
| 2,404,915 | A | 7/1946 | McCullough |
| D163,117 | S | 5/1951 | Hobbs |
| 2,626,078 | A | 1/1953 | Hutchisson |
| 2,628,081 | A | 2/1953 | Laird |
| 2,711,644 | A | 6/1955 | Myers |
| 2,761,659 | A | 9/1956 | Collura |
| 2,774,576 | A | 12/1956 | Frank |
| 2,776,691 | A | 1/1957 | Tupper |
| D180,096 | S | 4/1957 | Moore |
| 2,798,701 | A | 7/1957 | Francesco |
| 2,860,550 | A | 11/1958 | Louis |
| 2,897,862 | A | 8/1959 | Malz |
| 2,924,349 | A | 2/1960 | Huck |
| 2,942,301 | A | 6/1960 | Price |
| 2,954,174 | A | 9/1960 | Polleys |
| 2,955,186 | A | 10/1960 | Ritter |
| 3,064,949 | A | 11/1962 | Dewenter |
| 3,082,900 | A | 3/1963 | Goodman |
| D198,303 | S | 5/1964 | Dewenter |
| 3,175,594 | A | 3/1965 | Ivar |
| 3,216,473 | A | 11/1965 | Dewenter |
| 3,223,486 | A | 12/1965 | Holl |
| D204,117 | S | 3/1966 | Di Sesa |
| 3,240,246 | A | 3/1966 | Dewenter |
| 3,299,226 | A | 1/1967 | Edwards |
| 3,311,353 | A | 3/1967 | Rogenski |
| D207,692 | S | 5/1967 | Dykes |
| 3,342,425 | A | 9/1967 | Morton |
| 3,355,045 | A | 11/1967 | David |
| 3,362,590 | A | 1/1968 | Martin |
| 3,363,820 | A | 1/1968 | Schilling |
| 3,417,972 | A | 12/1968 | Vincent |
| 3,419,196 | A | 12/1968 | Moore |
| 3,441,173 | A | 4/1969 | Edwards |
| D217,178 | S | 4/1970 | Crider |
| 3,548,280 | A | 12/1970 | Cockroft |
| D220,416 | S | 4/1971 | Folden |
| 3,612,126 | A | 10/1971 | Emmons |
| 3,627,008 | A | 12/1971 | Samuelian |
| 3,731,059 | A | 5/1973 | Wilson |
| 3,738,583 | A | 6/1973 | Berland |
| D227,535 | S | 7/1973 | Grimes |
| D228,698 | S | 10/1973 | Barnard |
| 3,812,995 | A | 5/1974 | Lewis |
| D232,297 | S | 8/1974 | Mantelet |
| 3,841,528 | A | 10/1974 | Eisenberg |
| 3,873,435 | A | 3/1975 | Ziebarth |
| 3,943,421 | A | 3/1976 | Shibata et al. |
| 3,951,351 | A | 4/1976 | Ernster et al. |
| 3,963,220 | A | 6/1976 | Ohchi |
| D241,228 | S | 8/1976 | Boduch |
| 4,003,555 | A | 1/1977 | Swartz |
| 4,087,053 | A | 5/1978 | Voglesonger |
| D257,315 | S | 10/1980 | Keon |
| D259,133 | S | 5/1981 | Klawitter |
| 4,561,782 | A | 12/1985 | Jacobsen |
| 4,568,193 | A | 2/1986 | Contri et al. |
| D282,896 | S | 3/1986 | Conti |
| D286,726 | S | 11/1986 | Daenen |
| D287,324 | S | 12/1986 | Schmidt |
| 4,655,373 | A | 4/1987 | Essen |
| 4,660,733 | A | 4/1987 | Snyder |
| 4,664,530 | A | 5/1987 | Kurome |
| 4,671,452 | A | 6/1987 | Pupp |
| 4,686,356 | A | 8/1987 | Ueda et al. |
| D291,659 | S | 9/1987 | Powell |
| 4,762,057 | A | 8/1988 | Hirota et al. |
| 4,822,172 | A | 4/1989 | Stottmann |
| 4,891,966 | A | 1/1990 | Kramer |
| 4,893,942 | A | 1/1990 | Stottmann |
| 4,911,557 | A | 3/1990 | Dormer |
| D309,077 | S | 7/1990 | Pomroy |
| 4,968,864 | A | 11/1990 | Doi et al. |
| 4,981,365 | A | 1/1991 | Bow |
| 5,156,867 | A | 10/1992 | Leuthold et al. |
| D335,382 | S | 5/1993 | O'brien |
| D336,590 | S | 6/1993 | Barnard |
| 5,219,419 | A | 6/1993 | Prothe |
| 5,226,558 | A | 7/1993 | Whitney |
| 5,267,211 | A | 11/1993 | Kobayashi et al. |
| 5,267,790 | A | 12/1993 | Sutherland et al. |
| 5,287,980 | A | 2/1994 | Saltz |
| 5,316,382 | A | 5/1994 | Penaranda et al. |
| 5,323,973 | A | 6/1994 | Ferrara |
| 5,332,115 | A | 7/1994 | Schafer |
| D350,451 | S | 9/1994 | Dickson |
| 5,347,205 | A | 9/1994 | Piland |
| 5,360,176 | A | 11/1994 | Mugge |
| 5,363,746 | A | 11/1994 | Gordon |
| 5,392,695 | A | 2/1995 | Junkel |
| 5,397,022 | A | 3/1995 | Schafer |
| 5,487,511 | A | 1/1996 | Sansone |
| 5,531,153 | A | 7/1996 | Maruyama et al. |
| 5,551,594 | A | 9/1996 | Schafer |
| 5,556,198 | A | 9/1996 | Dickson, Jr. et al. |
| 5,562,020 | A | 10/1996 | Shigeshiro |
| 5,577,735 | A | 11/1996 | Reed et al. |
| 5,589,119 | A | 12/1996 | Hetherington |
| 5,605,090 | A | 2/1997 | Mantani et al. |
| 5,616,083 | A | 4/1997 | Subbaraman |
| 5,660,467 | A | 8/1997 | Mineo et al. |
| 5,660,468 | A | 8/1997 | Okajima |
| 5,678,726 | A | 10/1997 | Porteous |
| 5,738,240 | A | 4/1998 | Vavra |
| 5,768,978 | A | 6/1998 | Dorner et al. |
| 5,823,382 | A | 10/1998 | Van Giezen |
| 5,829,341 | A * | 11/1998 | Lin ..................... H05B 6/6438 |
| | | | 219/400 |
| 5,839,356 | A | 11/1998 | Dornbush et al. |
| 5,888,565 | A | 3/1999 | Gics |
| 5,957,577 | A | 9/1999 | Dickson |
| 5,958,484 | A | 9/1999 | Gics |
| 5,967,021 | A | 10/1999 | Yung |
| 6,065,861 | A | 5/2000 | Chen |
| D429,956 | S | 8/2000 | Bohannon |
| 6,116,469 | A | 9/2000 | Wallays |
| D435,192 | S | 12/2000 | Bohannon |
| D437,192 | S | 2/2001 | Verherbrugghen |
| D437,731 | S | 2/2001 | Thackray |
| 6,210,033 | B1 | 4/2001 | Karkos, Jr. et al. |
| D452,296 | S | 12/2001 | Egnell |
| 6,364,522 | B2 | 4/2002 | Kolar et al. |
| 6,390,665 | B1 | 5/2002 | Silveria |
| D458,723 | S | 6/2002 | Malvasio |
| 6,402,365 | B1 | 6/2002 | Wong |
| 6,609,821 | B2 | 8/2003 | Wulf et al. |
| D480,904 | S | 10/2003 | Backes |
| D480,915 | S | 10/2003 | Kolar |
| 6,632,013 | B2 | 10/2003 | Wulf |
| 6,705,484 | B2 | 3/2004 | Schäfer |
| 6,715,706 | B1 | 4/2004 | Planca |
| D491,019 | S | 6/2004 | Marsden |
| D495,925 | S | 9/2004 | Ulanski |
| 6,811,303 | B2 | 11/2004 | Dickson |
| 6,854,876 | B2 | 2/2005 | Dickson |
| D508,187 | S | 8/2005 | Dais |
| D508,188 | S | 8/2005 | Zettle |
| 6,959,562 | B2 | 11/2005 | Navedo et al. |
| 6,979,117 | B2 | 12/2005 | Dickson |
| D514,458 | S | 2/2006 | Lawson |
| D514,868 | S | 2/2006 | Achenbach |

(56)          References Cited

U.S. PATENT DOCUMENTS

| | | |
|---|---|---|
| D521,316 S | 5/2006 | Katz |
| 7,047,872 B2 | 5/2006 | Mulle |
| 7,063,456 B2 | 6/2006 | Miller |
| D525,080 S | 7/2006 | Katz |
| D526,839 S | 8/2006 | Boozer |
| D527,575 S | 9/2006 | Ulanski |
| D527,588 S | 9/2006 | De Groote |
| D528,363 S | 9/2006 | Ulanski |
| 7,267,478 B2 | 9/2007 | Miller |
| D552,916 S | 10/2007 | Bodum |
| 7,275,666 B2 | 10/2007 | Rukavina |
| 7,281,842 B2 | 10/2007 | Dickson |
| 7,350,963 B2 | 4/2008 | Williams |
| 7,357,273 B1 | 4/2008 | Lutz |
| D568,156 S | 5/2008 | Wilson |
| D577,545 S | 9/2008 | Ulanski |
| 7,422,362 B2 | 9/2008 | Sands |
| D587,526 S | 3/2009 | Barnard |
| D588,406 S | 3/2009 | Ulanski |
| 7,520,659 B2 | 4/2009 | Wulf |
| D597,380 S | 8/2009 | Epstein |
| 7,632,007 B2 | 12/2009 | Wulf |
| 7,648,264 B2 | 1/2010 | Breviere |
| D611,384 S | 3/2010 | Biegel |
| D621,656 S | 8/2010 | Ulanski |
| D637,862 S | 5/2011 | Fouquet |
| 7,975,868 B1 | 7/2011 | Flies |
| D645,340 S | 9/2011 | Menard |
| D655,133 S | 3/2012 | Brinckerhoff |
| D661,947 S | 6/2012 | Conti |
| D662,359 S | 6/2012 | Boozer |
| D664,808 S | 8/2012 | Dickson |
| D672,617 S | 12/2012 | Stamper |
| D673,010 S | 12/2012 | Stamper |
| D678,727 S | 3/2013 | Kolar |
| D685,263 S | 7/2013 | Danenberg |
| 8,529,120 B2 | 9/2013 | Ulanski |
| D698,649 S | 2/2014 | Quint |
| D705,064 S | 5/2014 | Sy |
| D705,606 S | 5/2014 | Coakley |
| D708,903 S | 7/2014 | Wong |
| D711,192 S | 8/2014 | Picozza |
| 8,814,011 B2 | 8/2014 | Ulanski |
| D738,670 S | 9/2015 | Sands |
| D742,172 S | 11/2015 | Dickson |
| 9,259,122 B2 | 2/2016 | Martin et al. |
| D753,482 S | 4/2016 | Serrano |
| D753,954 S | 4/2016 | Schreiber |
| D756,771 S | 5/2016 | Covey |
| 9,370,280 B2 | 6/2016 | Conti |
| D777,515 S | 1/2017 | Potter |
| D782,247 S | 3/2017 | Kim |
| D783,354 S | 4/2017 | Smith |
| D783,355 S | 4/2017 | Tu |
| D783,356 S | 4/2017 | Kim |
| D793,227 S | 8/2017 | Maskell |
| D798,109 S | 9/2017 | Ulanski |
| 2002/0009017 A1 | 1/2002 | Kolar et al. |
| 2002/0141286 A1 | 10/2002 | Wulf |
| 2002/0176320 A1 | 11/2002 | Wulf et al. |
| 2003/0121189 A1 | 7/2003 | Williams |
| 2003/0147234 A1 | 8/2003 | Harada |
| 2003/0213373 A1 | 11/2003 | Dickson |
| 2003/0214875 A1 | 11/2003 | Dickson |
| 2004/0011798 A1 | 1/2004 | Dubois |
| 2004/0100862 A1 | 5/2004 | Arroubi |
| 2004/0203387 A1 | 10/2004 | Grannan |
| 2005/0018534 A1 | 1/2005 | Nikkah |
| 2005/0061821 A1 | 3/2005 | Smith |
| 2005/0099884 A1 | 5/2005 | Lee |
| 2005/0133514 A1 | 6/2005 | Schutz |
| 2005/0229795 A1 | 10/2005 | Stuckey |
| 2005/0258197 A1 | 11/2005 | Rukavina |
| 2006/0086843 A1 | 4/2006 | Lin et al. |
| 2006/0108372 A1 | 5/2006 | Aiken |

| | | |
|---|---|---|
| 2006/0169715 A1 | 8/2006 | Emmendorfer et al. |
| 2006/0176765 A1 | 8/2006 | Pryor |
| 2006/0203610 A1 | 9/2006 | Bohannon, Jr. et al. |
| 2006/0214765 A1* | 9/2006 | Pitchers ........... G06K 19/07345 |
| | | 340/3.4 |
| 2006/0261066 A1 | 11/2006 | Boozer |
| 2007/0165484 A1 | 7/2007 | Branson |
| 2007/0210194 A1 | 9/2007 | Carnevale |
| 2007/0221668 A1 | 9/2007 | Baarman et al. |
| 2008/0163767 A1* | 7/2008 | Wu Chang ............ A47J 19/027 |
| | | 99/492 |
| 2008/0170465 A1 | 7/2008 | Bohannon |
| 2008/0221739 A1* | 9/2008 | Pryor .................. A47J 43/0766 |
| | | 700/292 |
| 2009/0032551 A1 | 2/2009 | Mcginley |
| 2009/0045229 A1 | 2/2009 | Mcginley |
| 2009/0078594 A1 | 3/2009 | Lookholder |
| 2009/0129200 A1 | 5/2009 | Breviere |
| 2009/0167506 A1* | 7/2009 | Wong ..................... H05B 6/688 |
| | | 340/286.02 |
| 2009/0225626 A1* | 9/2009 | Baumfalk ............... B01F 31/22 |
| | | 366/151.2 |
| 2009/0238034 A1 | 9/2009 | Ulanski |
| 2010/0227038 A1 | 9/2010 | Carroll |
| 2011/0046786 A1 | 2/2011 | Wulf |
| 2011/0189358 A1 | 8/2011 | Herbert |
| 2011/0199852 A1 | 8/2011 | Martin |
| 2011/0210195 A1 | 9/2011 | Garcia |
| 2011/0240624 A1 | 10/2011 | Zhang |
| 2011/0248108 A1 | 10/2011 | Carriere |
| 2012/0206995 A1 | 8/2012 | Wu |
| 2013/0042767 A1 | 2/2013 | Vidal et al. |
| 2013/0074706 A1 | 3/2013 | Fevre |
| 2013/0153572 A1 | 6/2013 | Gillette |
| 2013/0192477 A1 | 8/2013 | Hoare |
| 2014/0144804 A1 | 5/2014 | Roodnat |
| 2014/0233344 A1 | 8/2014 | Aliberti |
| 2014/0247686 A1 | 9/2014 | Arnett |
| 2015/0008255 A1 | 1/2015 | Lin |
| 2015/0044344 A1 | 2/2015 | Choi |
| 2015/0258514 A1 | 9/2015 | Boozer |
| 2015/0265983 A1 | 9/2015 | Fleming |
| 2015/0272394 A1 | 10/2015 | Lin |
| 2015/0366385 A1 | 12/2015 | Wang |
| 2017/0224169 A1 | 8/2017 | Kolar |
| 2017/0274332 A1 | 9/2017 | Gandhi |
| 2017/0283149 A1 | 10/2017 | Rhue |

FOREIGN PATENT DOCUMENTS

| | | |
|---|---|---|
| CN | 200973620 | 11/2007 |
| CN | 101194807 | 6/2008 |
| CN | 201899991 U | 7/2011 |
| CN | 202312540 | 7/2012 |
| CN | 102892344 | 1/2013 |
| DE | 19539382 | 1/1997 |
| DE | 19947466 | 5/2001 |
| EP | 0963726 | 12/1999 |
| EP | 2548485 | 1/2013 |
| FR | 2585676 | 2/1987 |
| GB | 3013649 | 7/2003 |
| GB | 2398733 | 9/2004 |
| JP | 401145030 | 6/1989 |
| JP | H1145031 | 6/1989 |
| JP | 401310616 | 12/1989 |
| JP | 403193013 | 8/1991 |
| JP | 404017820 | 1/1992 |
| JP | 406178734 | 6/1994 |
| JP | H0937970 | 2/1997 |
| JP | 2002-210287 | 7/2002 |
| JP | 2005-040147 | 2/2005 |
| KR | 10-1995-0003546 | 2/1995 |
| KR | 20-1999-0001638 | 1/1999 |
| KR | 10-2001-0073392 | 8/2001 |
| KR | 10-2013-0085276 | 7/2013 |
| WO | WO9615706 | 5/1996 |
| WO | WO03001954 | 1/2003 |
| WO | 2005031952 | 4/2005 |

(56)                    References Cited

FOREIGN PATENT DOCUMENTS

| WO | 2006104651 | 10/2006 | |
| WO | WO-2006104651 A2 * | 10/2006 | .......... A47J 43/0705 |
| WO | 2006124051 | 11/2006 | |
| WO | WO2007061967 | 5/2007 | |

OTHER PUBLICATIONS

Young, Lee, International Search Report and Written Opinion, PCT/US2015/020769, Jun. 17, 2015, ISA/US, Alexandria, Virginia.
International Search Report for PCT/US2015/021663 dated Jun. 25, 2015.
Annex to Form PCT/ISA/206 Communication Relating to the Results of the Partial International Search (International Application No. PCT/US2009/001077—1 page from communication dated Jun. 29, 2009).
Communication pursuant to Article 94(3) European Patent Office regarding Application No. 14762667.5, dated Nov. 29, 2018.
Copenheaver, Blaine, International Search Report and Written Opinion, PCT/US2014/029134, Aug. 1, 2014, International Search Authority/ USA.
Young, Lee W., International Search Report and Written Opinion, PCT/US2014/029384, Aug. 11, 2014, International Search Authority/ USA.
Gaggia Espanola, S.A., ipanerma, brochure, undated.
Gaggia Espanola, S.A., Copacabana, brochure, undated.
Gaggia Espanola, S.A., ipanema Space-Saving High Technology, brochure, undated.

* cited by examiner

40

10

14

52

48

TEMP:
100°C

POWERED BLENDING CONTAINER

CROSS-REFERENCE TO RELATED APPLICATION

This application is a continuation of U.S. patent application Ser. No. 15/497,261, entitled "POWERED BLENDING CONTAINER," filed on Apr. 26, 2017, which is a continuation of U.S. patent application Ser. No. 14/213,557, entitled "POWERED BLENDING CONTAINER," filed on Mar. 14, 2014, now U.S. Pat. No. 10,638,886, which claims priority to U.S. Provisional Application No. 61/787,594 entitled "SELF-POWERED AND CHARGING BLENDER JAR," filed on Mar. 15, 2013, which are hereby incorporated by reference in their entirety.

TECHNICAL FIELD

The present teachings generally relate to a powered blending container, more specifically a blending container powered by a power source operatively connected to the blending container. The blending container includes features powered by the power source such as illuminated gradient markings, temperature sensors, interlocking features, vibration detection sensors, and sensors to detect air pockets.

BACKGROUND

Blenders to facilitate the processing of food, drinks, and other blended food preparations, have become ubiquitous in both commercial and residential settings. Such appliances are particularly useful where there are a variety of operations to be performed repeatedly with accuracy and precision.

Presently, blending containers are not powered. Having a separate power source for the blending container permits the addition of features that will further facilitate commercial and residential uses of blenders. For example, a powered blending container could include gradient markings that are luminescent. This would be of particular use in areas with low lighting, such as bars or restaurants, and would permit a user to more accurately measure ingredients in such environments.

SUMMARY

A blending device is shown and described. The blending device may include a blending container and a power source operatively connected to the blending container. The power source may be configured to supply power to the blending container. The blending container may also include a feature that is powered by the power source.

A blending device may include a blending container and a wireless power source positioned in the blending container for supplying power to the blending container. The blending container may also include gradient markings that are powered by the power source.

A blending device may include a blending container and a wireless power source operatively coupled to the blending container. The wireless power source may be directly connected to the blending container to supply power to the blending container. The blending container may also comprise a wireless sensor that is powered by the wireless power source.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

Figure 1:
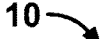
FIG. 1 is a perspective view of a blending device.
Figure 1:
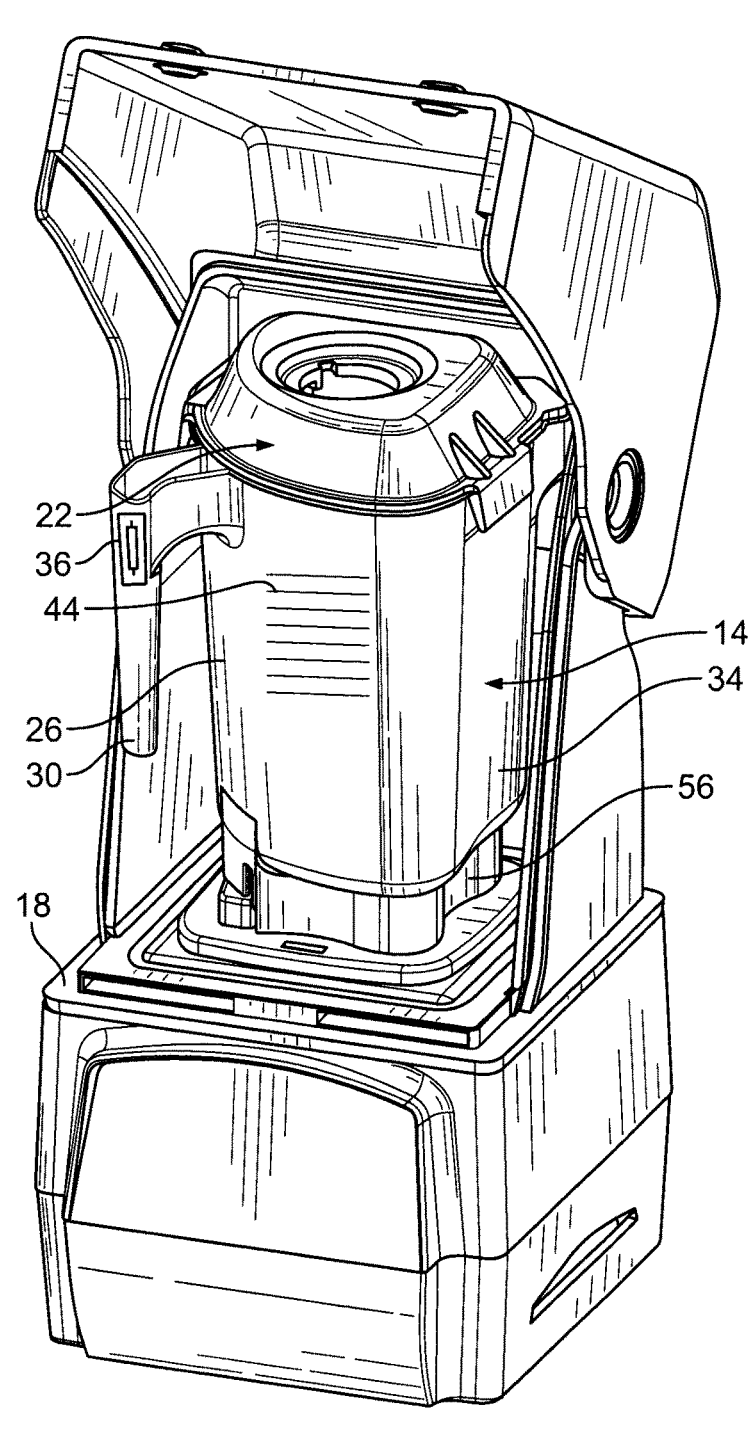

With reference to FIG. 1, an exemplary embodiment of a blending device 10 made in accordance with the present teaching is shown. The blending device 10 may include a blending container 14 and a blending base 18.

Blending container 14 may include a lid 22, a body 26, a handle 30, and a base 34. The blending container 14 may have a power source 36 positioned in the blending container 14 at any appropriate location. By way of a non-limiting example, the power source 36 may be positioned in the body 26, in the handle 30 or in the base 34. The power source 36 is configured to provide power to the blending container 14. The power source 36 may be of any appropriate type—the present teachings are not limited to the power source 36 shown herein. In the embodiment shown in FIG. 1, the power source 36 is an energy storage device, such as a battery 36. The battery 36 may be a rechargeable battery or a non-rechargeable battery. For those embodiments in which the battery 36 is a rechargeable battery, the battery 36 may be charged by the blender base 18 or by an external charging stand 40. The blending container 14 may be stored and charged on the external charging stand 40 when not in use.

The blending container 14 may include features that require power such as illuminated gradient markings, sensors, or a microprocessor. In the embodiment shown in FIG. 1, the blending container 14 includes gradient marker elements 44 that are luminescent. The power for illuminating the gradient marker elements 44 comes from the power source (e.g., the battery 36). The gradient marker elements 44 may be illuminated in any appropriate manner. The gradient marker elements may be individual elements and may be illuminated together or individually. For example, the illuminated gradient marker elements 44 may provide instructions for users to add ingredients during operation of the blending device 10 or merely as an illumination source for the blending container 14.

The blending container 14 may include gradient markers on a display panel that is attached to or is an integral part of the blending container 14. It will be appreciated that the display panel could be any appropriate means for displaying information, including, but not limited to an LCD, LED or OLED display.

Further still, the blending container 14 may include a light, such as an LED light or the like. The power source (e.g., the battery 36) may provide power to illuminate such light. The light may allow users to see the blending container 14 in dark conditions, e.g., in a dark bar.

As described below, the blending container 14 may be in operative communication with the blending base 18, the blending device 10 and/or other wireless devices. The display panel may display information received from sensors contained within the blending container 14 or information received from the blending base 18 or the blending device 10. The display panel may further display information received from another wireless device that is in operative communication with the blending container 14. For example, a wireless device, such as a tablet, may be used to download recipes or blending programs from a remote database or website, such as www.vitamix.com, and download the recipes or programs to the wireless device. The wireless device may then communicate the recipe information to the blending container 14 by way of a wireless controller. A display on the blending container 14 can then display the recipe information to the user in a step by step format so that the user can easily follow the recipe instructions while using the blender.

By way of a non-limiting example, the user may be directed to add ingredients to the blending container 14 upon illumination of one or more of the gradient marker elements 44. Further still, the amount of ingredients may be indicated by illuminating a predetermined one or more of the gradient marker elements 44 so that the user may add such ingredient up to the illuminated gradient marker elements 44. Similarly, the blending container 14 may direct the user to turn on or off a specific blending process, such as through illumination of the gradient marker elements 44 and/or the light. In these embodiments, the light or gradient marker elements 44 may illuminate when the user is to take a step with regard to a recipe, e.g., turn off the blending system 10.

The blending container 14 may include a sensor that is powered by the power source. The sensor may be a wireless sensor operatively coupled with the power source. It should be understood that the sensors described herein are non-limiting examples of the types of sensors that can be powered by the power source of the blending container 14. It should be further understood that any appropriate method for displaying, notifying or otherwise interpreting the information from the sensors can be used in the blending device 10 of the present teachings.

Figure 3:
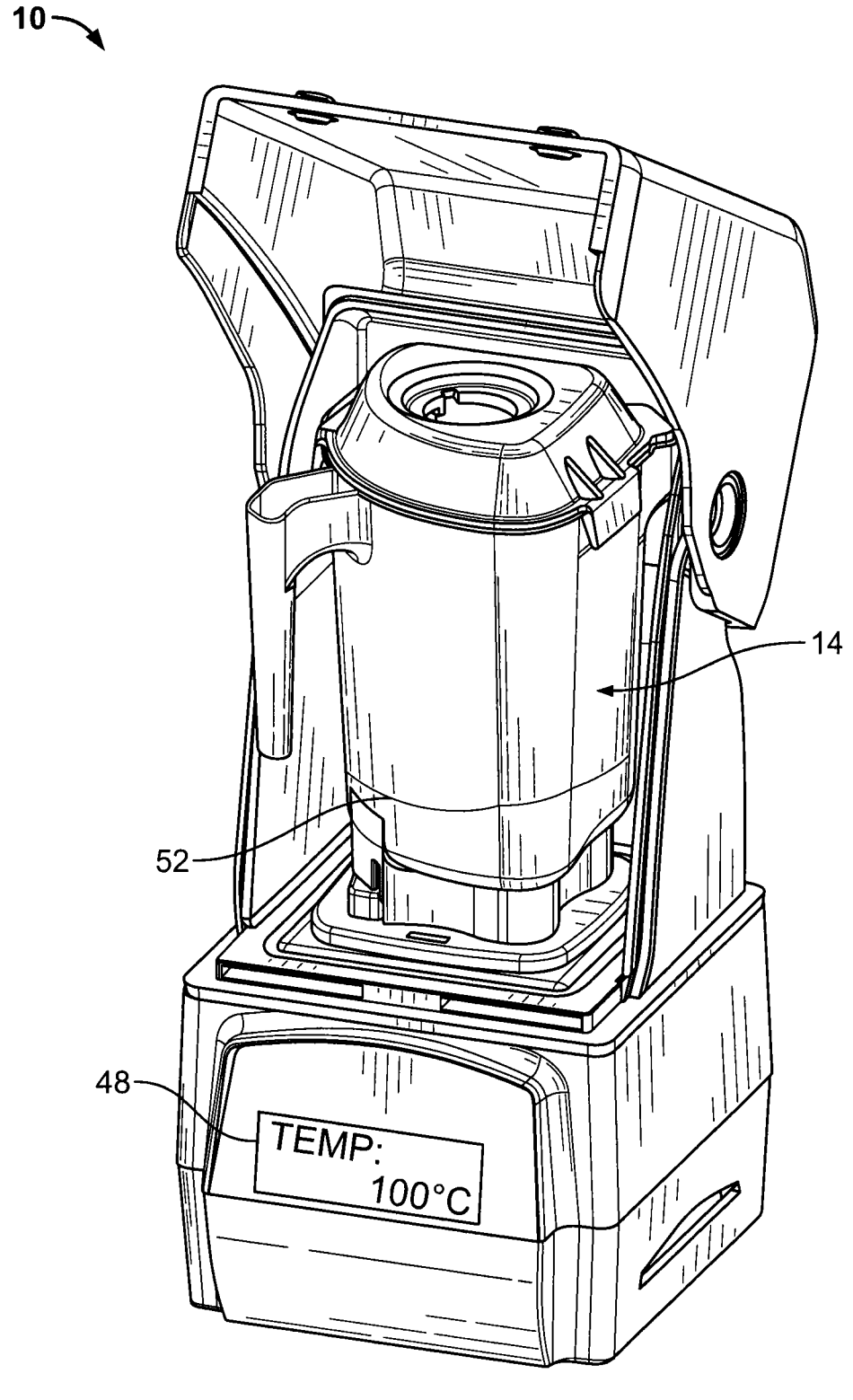
FIG. 3 is a perspective view of a blending device with a sensor included in the blending container.

In the embodiment shown in FIG. 3, the blending container 14 includes a sensor 52 for detecting the temperature of the contents of the blending container 14. A display 48 may be operatively connected to the sensor and may display the temperature of the blending container 14 contents to the user. The sensor may be in operative connection with an alarm that is triggered when a desired temperature is reached. By way of a non-limiting example, the alarm may be illumination of the gradient marker elements 44 or light, may be an audible alarm or a combination of such.

The blending container 14 may include a sensor for detecting an air pocket in the content of the blending container 14. The sensor may be operatively connected to a display system that provides notification to the user that there is an air pocket in the contents of the blending container 14. The user can then remove the air pocket by, e.g., stirring the contents, utilizing a tamper to tamp the contents, or adjusting the speed of the blending system 10 accordingly. Further, the sensor may be operatively connected to a control panel that adjusts the blending speed to eliminate the air pocket.

The blending container 14 may include a sensor for detecting vibrations of the blending device 10. The sensor may be operatively connected to a control panel, a display panel or to the blade assembly 56. If, for example, the vibrations from the blending device 10 exceed a predetermined threshold, the display panel may alert the user and/or the blending device 10 may automatically turn off via the control panel. By way of a non-limiting example, the control panel may alert the user by illuminating one of the gradient marker elements 44 or the light, provide an audible alert or a combination of such.

As identified above, the blending container 14 may include the lid 22 selectively attached thereto. A sensor for detecting presence of the lid 22 may be included in the blending container 14. The blending container 14 and the lid 22 may include an interlock feature. The interlock feature may be of any appropriate configuration to generally prevent the blending device 10 from operating when the lid 22 is not on the blending container 14 or is not positioned correctly on the blending container 14. If the sensor does not detect presence of the lid 22 on the blending container 14, the blending device 10 may be configured to be disabled, i.e., not operate.

In an embodiment, the lid 22 may include a magnet and the blending container 14 may include a magnet and a sensor, such as a reed switch (not shown) in its proximity. The reed switch may be utilized to indicate when both magnets are in sufficient proximity to indicate that the lid 22 is on the blending container 14.

Figure 4B:
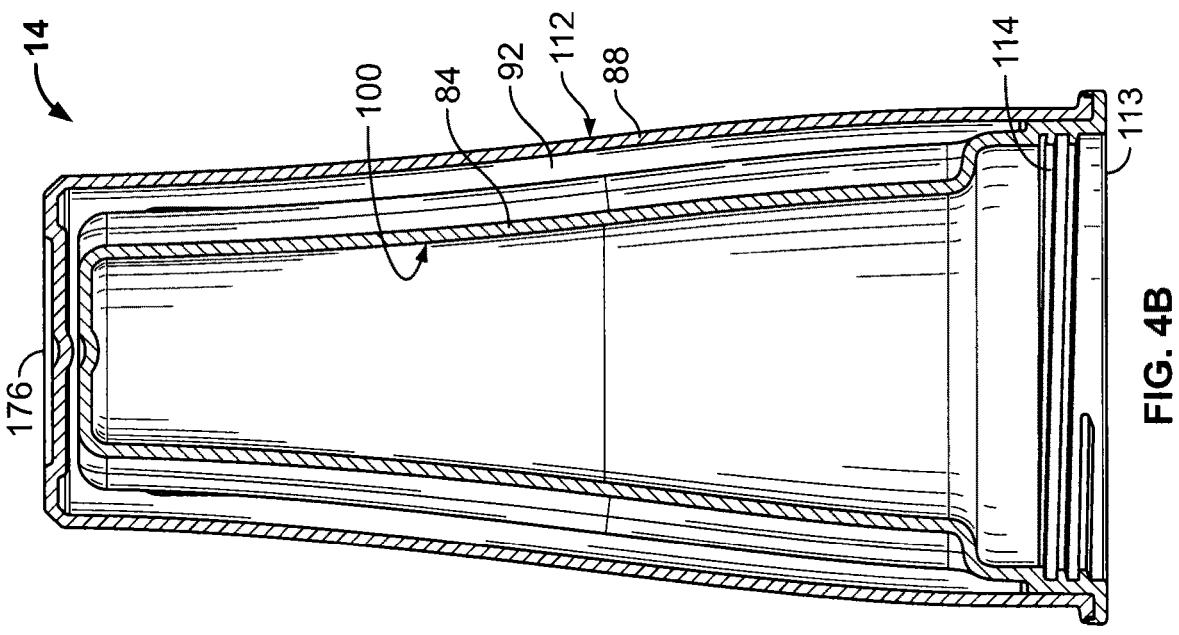
FIG. 4B is a second cross-sectional view of a blending container.
Figure 4A:
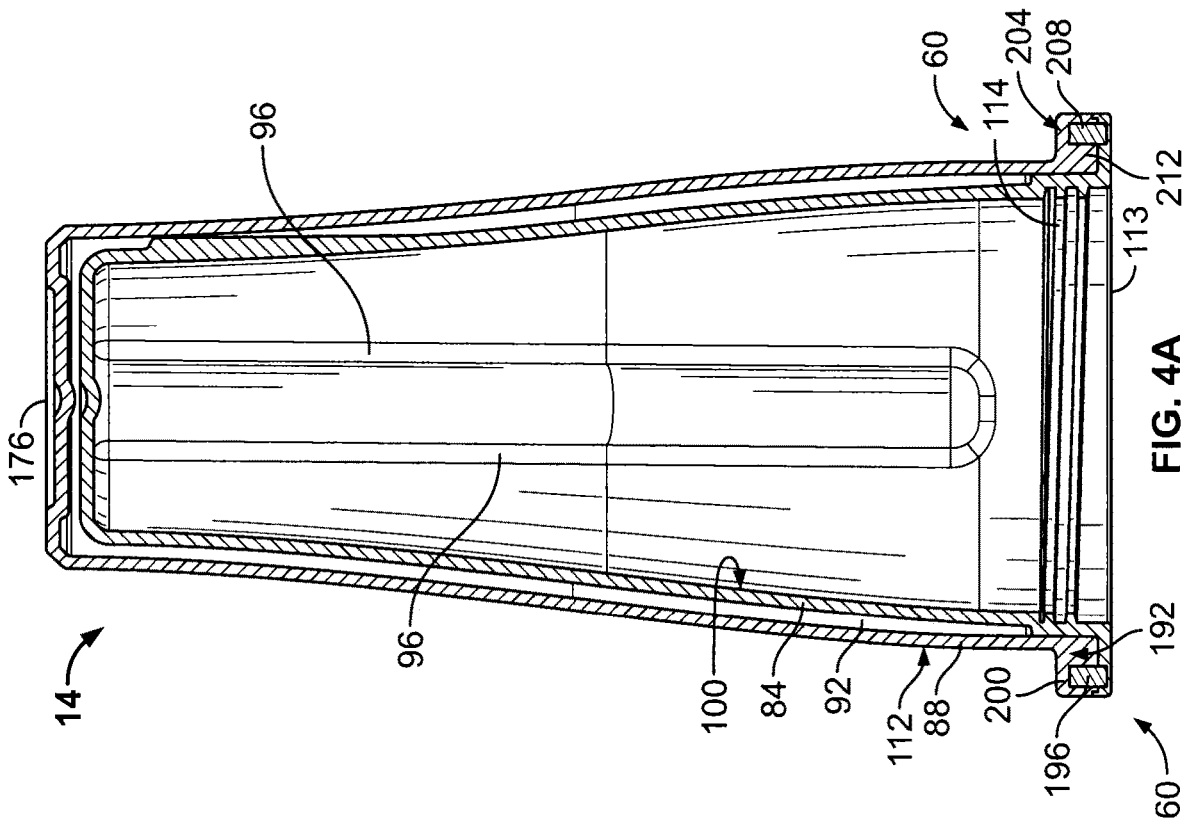
FIG. 4A is a first cross-sectional view of a blending container.
Figure 5:
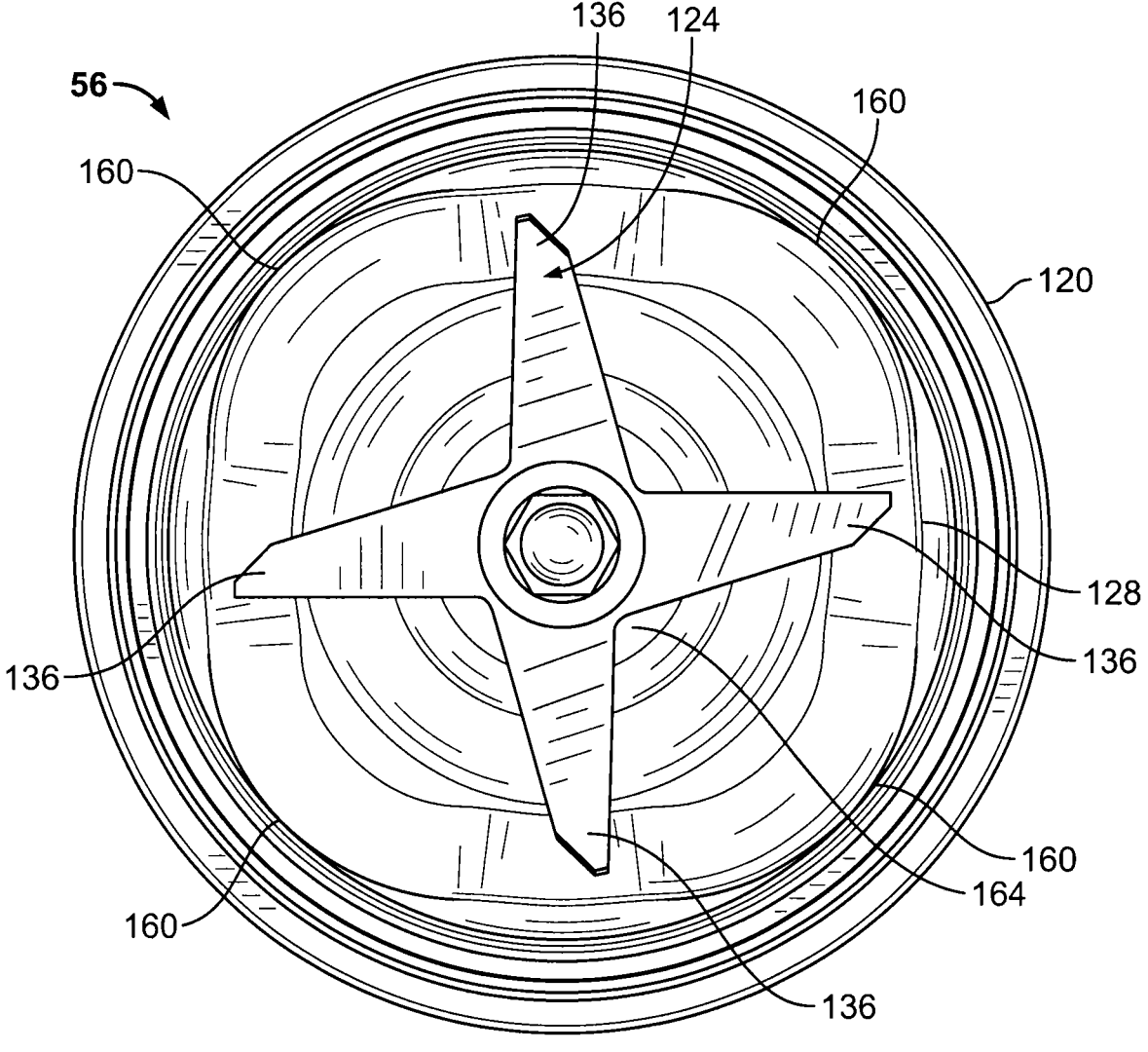
FIG. 5 is a perspective view of an embodiment of the blade base.

The blending container 14 may include a sensor as part of an interlock feature 60. In the embodiment shown in FIGS. 4A and 4B, the blending container 14 and blade assembly 56 may include the interlock feature 60. The interlock feature 60 may be of any appropriate configuration to generally prevent access to the blade 124 when it is spinning. As shown in FIG. 4A, for example, the blending container 14 may include a first tab 192 extending therefrom. As shown in FIG. 4A, the first tab 192 may include a magnet 196 embedded therein. The at least one magnet 196 may be secured with the blending container 14 in any appropriate manner. By way of a non-limiting example, the magnet 196 may be welded into a pocket 200 formed in the blending container 14 between the inner layer 84 and the outer layer 88. In a further non-limiting example, the magnet 196 may be adhered, such as through use of an adhesive, between the inner layer 84 and the outer layer 88 of the blending container 14.

Further, as shown, the blending container 14 may include a second tab 204 extending therefrom. The second tab 204 may be of a similar configuration as the first tab 192, but may be of a different size. Further, the second tab 204 may be offset from the first tab 192 along the circumference of the blending container 14 at an angle that is other than 180 degrees. In other words, the first tab 192 and second tab 204 are not aligned with one another, as described in more detail below. The second tab 204 may include a second magnet 208 embedded therein. The second magnet 208 may be welded into a second pocket 212 formed in the blending container 14 between the inner layer 84 and the outer layer 88. In a further non-limiting example, the second magnet 208 may be adhered, such as through use of an adhesive, between the inner layer 84 and the outer layer 88 of the blending container 32. While the first tab 192 and second tab 204 with the magnet 196 and second magnet 208 are shown and described, any number of tabs and magnets may be used without departing from the present teachings. Further still, the number of tabs and magnets utilized are not limited to that shown. Any appropriate number of tabs and magnets may be utilized, e.g., three, four, etc.

In these embodiments, the first magnet 196 and second magnet 208 may be positioned in the tabs 192 and 204, respectively. Once inserted therein, the inner and outer layers 84, 88 may be sonic welded together. Once sonic welded, the magnets 196 and 208 are melted into the tabs 192 and 204 capturing the magnets 196 and 208 between the inner and outer layers 84, 88.

Figure 6:
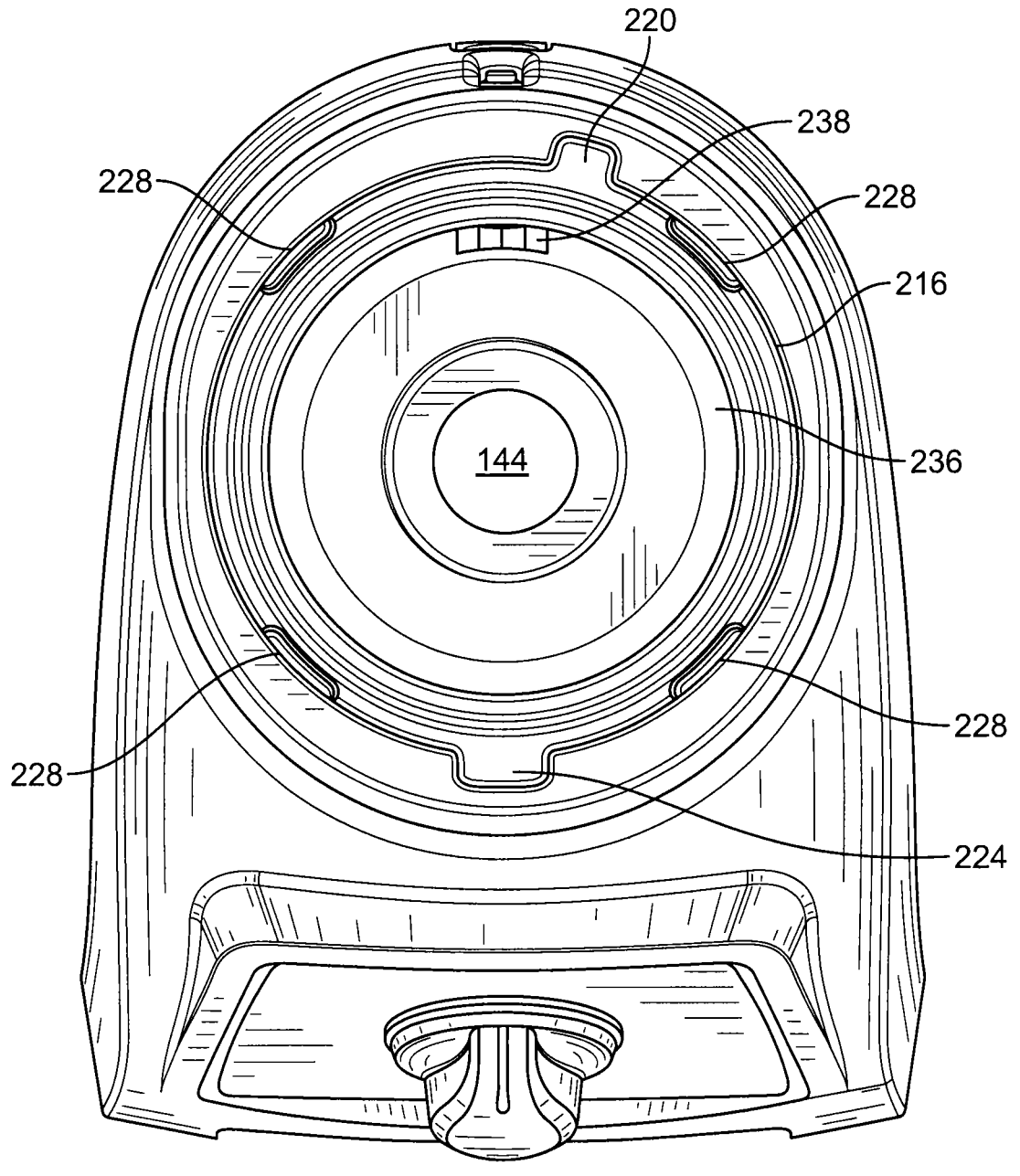
FIG. 6 is a plan view of a blender base.

As shown in FIG. 6, the blender base 24 may include a lip 216 in the opening 116 in the pedestal 76; the lip 216 may generally encompass a majority portion or all of the opening 116. The lip 216 may include first and second recessed portions 220, 224. The first and second recessed portions 220, 224 may be configured such that the tab 192 and second tab 204 are selectively and operatively engageable with such first and second recessed portions 220, 224. The first recessed portion 220 may be shaped and sized such that only the first tab 192 may be capable of operatively engaging it. Similarly, the second recessed portion 224 may be shaped and sized such that only the second tab 204 is operatively engageable therewith.

Further each of the first and second recessed portions 220, 224 may include a sensor, such as a reed switch (not shown) in its proximity. The reed switch may be utilized to indicate when both of the tab 192 and second tab 204 are operatively positioned within the first and second recesses 220, 224. Contacts of the reed switch may be in normally open position when the magnets 196 and 208 are not in proximity thereto, i.e., when the tabs 192 and 204 are not positioned in the first and second recessed portions 220, 224. When the magnets 196 and 208 within the tabs 192, 204, respectively, are moved in operative proximity to the reed switch, the reed switch will close, i.e., the reed switch will close when a magnetic field is present. Once the magnets 196 and 208 are moved away from the switch, the reed switch will go back to its original open position.

When the reed switch is in the open position, the motor (not shown) is configured to be disabled, i.e., not operate. When the motor is disabled, the blade assembly 56 and more particularly, the blade 124 is not capable of operation. Therefore, in order to operate the blending system 10, the blending container 14 and blade assembly 56 must be operatively coupled with the blender base 18. Specifically, the tabs 192 and 208 must be operatively positioned within the first and second recessed portions 220, 224, respectively in order for the blending system 10 to operate. This generally prevents the user from being able to access or otherwise contact the blade 124.

The blending container 14 may be connected to a microprocessor. The microprocessor may be configured to receive inputs from the user (e.g., push-button controls) or from the sensors. The microprocessor may further be configured to receive power from the power source and to perform the tasks described herein. For example, the microprocessor may receive input from the sensors and may be programmed to carry out given tasks based on sensor inputs. The display on the blending container 14 may display any appropriate message received from the microprocessor.

The blending container 14 may include a wireless controller for communicating with the blending base 18 or the blending device 10. The blending container 14 may be configured to communicate wirelessly with other wireless devices (not shown), such as a smartphone, computer, tablet, personal computer, NFC point, or other wireless device. The wireless device may be capable of sending or receiving data, such as a blender program, recipe data or system settings, to the blending container 14 by way of a wireless controller.

The wireless controller may include a memory, a processor, and a wireless control module. The wireless signal may be any wireless signal, such as a Wi-Fi signal, Bluetooth signal, ZigBee signal, or cellular network signal. The wireless controller may be integrally formed with the blending container 14 or may be removably connectable to the blending container 14 through a communication port.

In an embodiment, the wireless device may be capable of downloading and running a software application. The software application may be capable of connecting to a network, such as the Internet. The software application may be capable of accessing step by step recipes or blending programs from a remote database or website, such as www.vitamix.com, and downloading the recipes or programs to the wireless device. One example of communicating the recipe, or other information, from the wireless device to the blending container 14 is through near field communication. For instance, data can be exchanged (e.g., recipes) between the wireless device and the blending container 14 when they are brought into a predefined close proximity of each other. The wireless device may then communicate the recipe information to the blending container 14 by way of the wireless controller. A display on the blending device 10 can then display the recipe information to a user in a step by step format so that the user can easily follow the recipe instructions while using the blender.

In an embodiment, the blender container 14 may communicate with a wireless device such as a tablet. The wireless device may transmit a recipe to the blending container 14. Using the wireless device, a user indicates when each step of the recipe has been completed (e.g., the ingredients have been added to the blending container). Once the steps of the recipe have been confirmed, the wireless device may transmit the blend profile (e.g., the motor speed, duration, etc.) to the blending container 14. Instructions to start the blending device 10 may be received from the tablet or the user may start the blending device by, for example, hitting the start button on the blending device 10.

In an embodiment, the blending container 14 includes one or more sensors configured to sense parameters of the blending device 10. The blending container 14 further includes a wireless controller configured to send a wireless signal related to one or more of the sensed parameters. The sensed parameters may include temperature, cycle time, cycle count, or other parameters. The blending container 14 may communicate the sensed parameters to the blending device 10.

In an embodiment, the wireless controller is configured to receive a blending program. The blender container 14 may communicate the blending program to the blending device 10. The blending program may comprise at least one motor speed and at least one time interval for the given motor speed. The program may be stored on a memory and recalled by the blending container 14 or the blending device 10.

The power source for the blending device 10 may be positioned in the blending container 14, e.g., in the lid 22, the body 26, the handle 30, the base 34 or any combination thereof. The power source may also be located in the blending base 18 such that when the blending container 14 is attached to the blending base 18, the power source positioned in the blending base could be used to power the blending container 18. The power source may be wireless. Non-limiting examples of power supplies include energy storage devices and rechargeable and regenerative power supplies.

Figure 2:
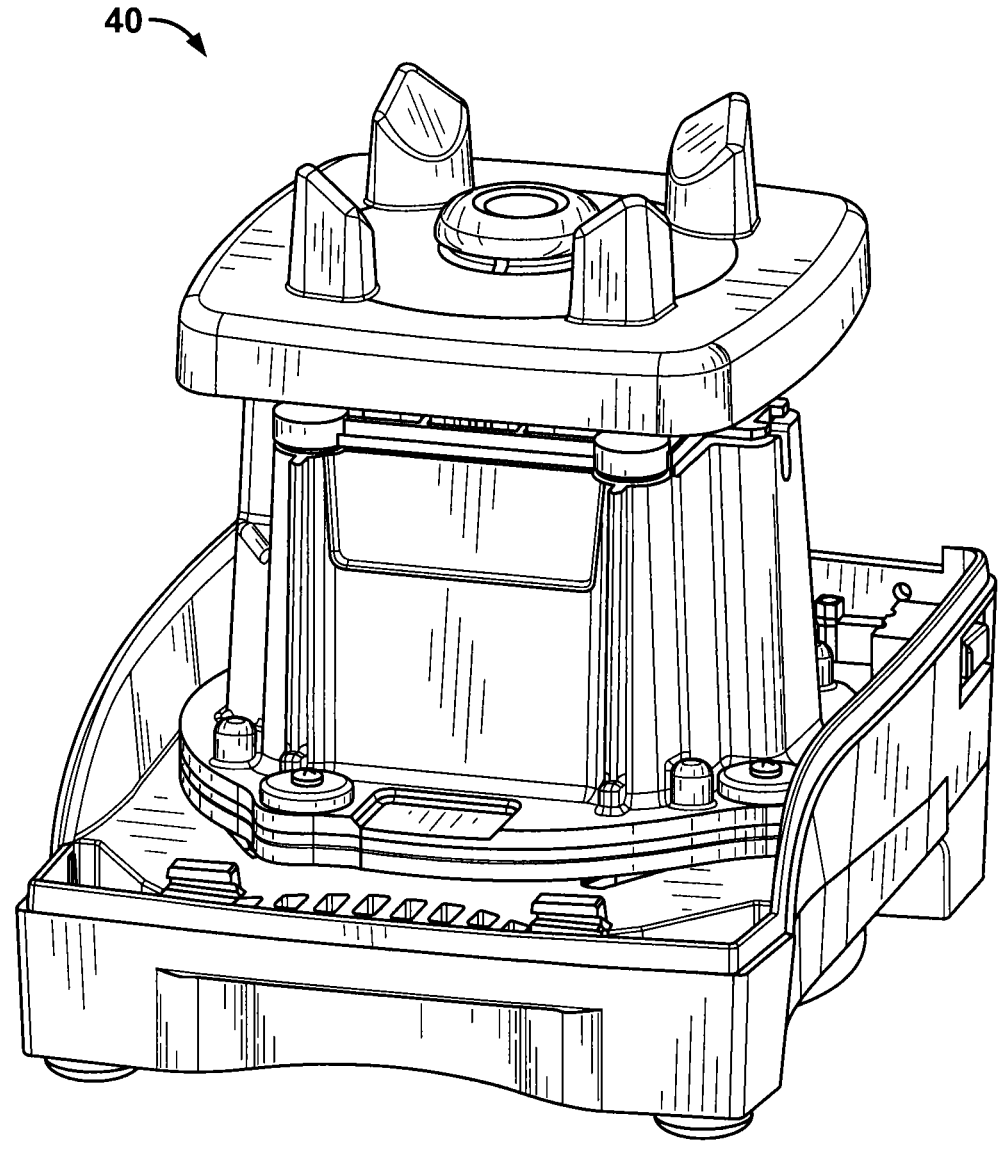
FIG. 2 is a top perspective view of an external charging stand.

In the embodiment depicted in FIG. 1, the power source is an energy storage device, specifically a battery 36 located in the handle 30 of the blending container 14. The battery 36 can be a rechargeable battery. The battery 36 can be recharged using the base of the blending device 10. For example, when the base 18 of the blending device 10 is plugged in, the power from the base may be used to charge the rechargeable battery 36. The battery 36 may also be charged on an external charging stand 40 when the blending device 10 is not being used. In the embodiment depicted in FIG. 2, the charging stand 40 is generally shaped like the blender base 18. However, it should be appreciated that the charging stand 40 may be of any appropriate configuration and is not limited to that shown and described. For example, the charging stand 40 can accommodate the blending container 14 such that the base of the blending container 14 is in contact with the charging stand 40. Alternatively, the lid portion of the blending container 14 could be in contact with the charging stand (i.e., the blending container 14 can be stored upside down on the charging stand).

The blending container 14 can also be powered using regenerative energy. For example, a coil may be embedded or encapsulated in the blending container 14. A magnet in operative proximity to the coil induces an electrical current and provides power to the blending container 14. The magnet moves with the movement of the blending device 10. When the magnet passes by the coil in the blending container 14, an electric current is induced and is available to provide power to the blending container 14. The magnet may be positioned in the blender base 18. The regenerative energy may be used to charge the rechargeable battery 36.

Other types of energy may be used to power the blender container 14. For example, solar energy could be the power source or could be used to recharge the power source.

Any of the described power sources could be used to charge or recharge an energy storage device such as a battery or capacitor.

Although the embodiments of the present teachings have been illustrated in the accompanying drawings and described in the foregoing detailed description, it is to be understood that the present teachings are not to be limited to just the embodiments disclosed, but that the present teachings described herein are capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A blending device, comprising:
a blending container; and
a power source operatively connected to the blending container, the power source comprising:
a coil encapsulated in the blending container; and
a magnet, wherein movement of the magnet in operative proximity to the coil induces an electrical current and supplies power to the blender container,
wherein the blending container includes a feature that is powered by the power source.

2. The blending device of claim 1, wherein the power source is a rechargeable power source.

3. The blending device of claim 1, wherein the power source comprises a regenerative power source that uses the motion created by the blending device to generate at least some of the power to the blending container.

4. The blending device of claim 1, wherein the power source comprises a solar power source and provides at least some of the power to the blending container.

5. The blending device of claim 1, wherein:
the blending container comprises a lid, a body, a handle, and a base; and
the coil of the power source is encapsulated in the handle of the blending container.

6. The blending device of claim 1, wherein:
the blending container comprises a lid, a body, a handle, and a base; and
the coil of the power source is encapsulated in the body of the blending container.

7. The blending device of claim 1, wherein:
the blending container comprises a lid, a body, a handle, and a base; and
the coil of the power source is encapsulated in the base of the blending container.

8. The blending device of claim 1, wherein the base of the blending container is connected to a blade assembly and the coil of the power source is encapsulated in the blade assembly.

9. The blending device of claim 1, further comprising a blender base, wherein the magnet is encapsulated in the blender base.

10. The blending device of claim 1, wherein the power source is an energy storage device.

11. The blending device of claim 10, wherein the energy storage device is charged by an external charging stand when the blending device is not being used.

12. The blending device of claim 1, wherein the feature comprises gradient markings that are powered by the power source.

13. The blending device of claim 12, wherein the gradient markings are formed by luminescent elements.

14. The blending device of claim 12, wherein the gradient markings are displayed on a display screen on the blending container.

15. A blending system, comprising:
a blender base;
a blending container that is selectively engageable with the blender base; and
a wireless power source comprising:
a coil encapsulated within the blending container, and
a magnet disposed within the blender base, wherein movement of the magnet in operative proximity to the coil induces an electrical current and supplies power to the blender container,
wherein the blending container comprises gradient markings powered by the power source.

16. The blending device of claim 15, wherein the power source is a rechargeable power source.

17. The blending device of claim 15, wherein the power source comprises a regenerative power source that uses the motion created by the blending device to generate at least some of the power to the blending container.

18. The blending device of claim 15, wherein the power source comprises a solar power source and provides at least some of the power to the blending container.

19. The blending device of claim 15, further comprising a blade assembly disposed in the blending container, wherein the magnet is encapsulated in the blade assembly.

20. The blending device of claim 15, wherein the power source is an energy storage device.

21. The blending device of claim 20, wherein the energy storage device is charged by an external charging stand when the blending device is not being used.

22. A blending device, comprising:

a blending container; and a wireless power source comprising:

a coil encapsulated in the blending container; and a magnet, wherein the movement of the magnet in operative proximity to the coil induces an electrical current and supplies power to the blender container, wherein the blending container comprises a wireless sensor that is powered by the power source.

23. The blending device of claim 22, wherein the power source is a rechargeable power source.

24. The blending device of claim 22, wherein the power source comprises a regenerative power source that uses the motion created by the blending device to generate at least some of the power to the blending container.

25. The blending device of claim 22, wherein the power source comprises a solar power source and provides at least some of the power to the blending container.

26. The blending device of claim 22, further comprising a blade assembly disposed in the blending container, wherein the magnet is encapsulated in the blade assembly.

27. The blending device of claim 22, wherein the power source is an energy storage device.

28. The blending device of claim 27, wherein the energy storage device is charged by an external charging stand when the blending device is not being used.

\* \* \* \* \*